United States Patent [19]
Sicking et al.

[11] Patent Number: 5,988,598
[45] Date of Patent: Nov. 23, 1999

[54] BREAKAWAY STEEL GUARDRAIL POST

[75] Inventors: Dean L. Sicking; John D. Reid; John R. Rohde, all of Lincoln, Nebr.

[73] Assignee: Safety By Design, Inc., Lincoln, Nebr.

[21] Appl. No.: 09/187,461

[22] Filed: Nov. 4, 1998

[51] Int. Cl.[6] .................................................. E01F 15/00
[52] U.S. Cl. ...................... 256/13.1; 256/1; 256/DIG. 5; 403/2; 52/98
[58] Field of Search .............................. 256/13.1, DIG. 5; 248/900, 548; 403/2; 52/98, 170; 40/607

[56] References Cited

U.S. PATENT DOCUMENTS

| | | | |
|---|---|---|---|
| 1,677,796 | 7/1928 | Parks | 248/548 |
| 3,606,222 | 9/1971 | Howard | 52/98 X |
| 4,236,843 | 12/1980 | Chisholm | 403/2 |
| 4,330,106 | 5/1982 | Chisholm | 256/13.1 |
| 4,928,446 | 5/1990 | Alexander, Sr. | 52/98 |
| 5,484,217 | 1/1996 | Carroll et al. | 403/2 |
| 5,664,905 | 9/1997 | Thompson et al. | 256/13.1 X |

*Primary Examiner*—Lynne Reichard
*Assistant Examiner*—John R. Cottingham
*Attorney, Agent, or Firm*—Miller, Sisson, Chapman & Nash, P.C.

[57] ABSTRACT

A breakaway guardrail post includes upper and lower post sections spaced apart but connected by a breakaway joint. The joint is attached at one end to the upper post by a first fastener set and connected at a second end by a second fastener set. The first fastener set has a failure strength less than that of the second fastener set. Upon impact forces being applied to the upper post section, the first fastener fails and the upper post section rotates downwardly.

6 Claims, 5 Drawing Sheets

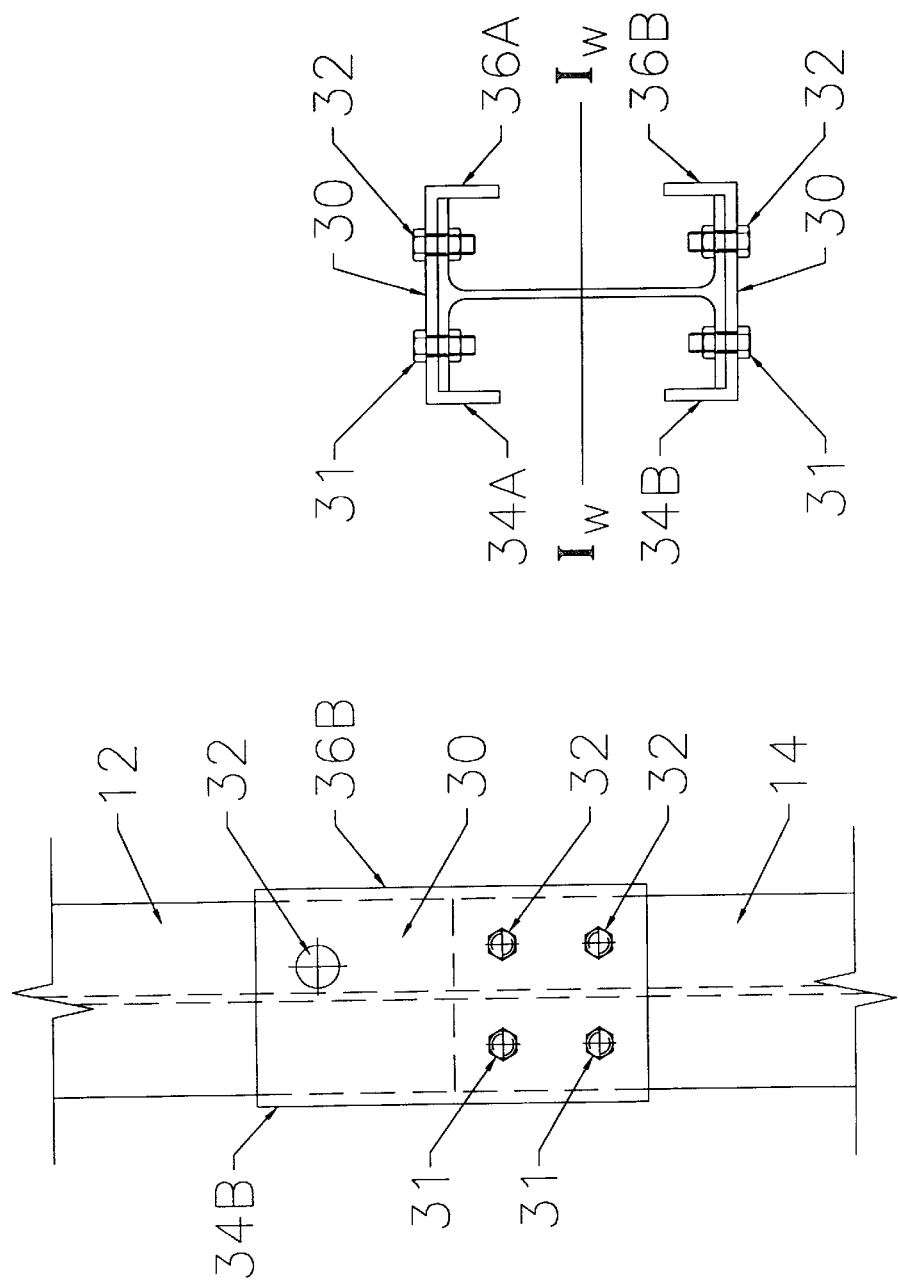

BREAKAWAY STEEL GUARDRAIL POST

BACKGROUND OF THE INVENTION

The present invention relates to breakaway steel posts for use with a highway guardrail end terminal system or a crash attenuation system.

Existing highway guardrail end treatment systems include: the breakaway cable terminal (BCT), the eccentric loader terminal (ELT), the modified eccentric loader terminal (MELT), the vehicle attenuating terminal (VAT), the extruder terminal (ET), the slotted rail terminal (SRT), the sequential kinking terminal (SKT), and the flared energy absorbing terminal (FLEAT).

In all of these systems, breakaway wooden posts, either inserted in foundation tubes (known as BCT breakaway post) or directly installed in the ground (known as controlled release terminal CRT post), are used to facilitate proper breaking of the posts to minimize the potential for snagging on the posts and excessive decelerations on the vehicles in end-on impacts with the terminals. Holes are drilled into the wooden post at and/or below ground level to reduce the cross-sectional area of the post, thus reducing the force required to break the post. Steel breakaway posts based on the slip-base concept have also been developed, but did not receive widespread acceptance due to maintenance problems and higher initial costs.

However, there are situations in which a transportation agency may choose not to use completely wooden posts for environmental concerns or as a matter of policy. In such situations, breakaway steel post would be an alternative. The present invention relates to various conceptual designs for breakaway posts suitable for use with highway guardrail and end terminal systems. These designs have a predictable breakaway force threshold when impacted along the weak axis (in the direction of end-on impacts with the terminal system) while maintaining a sufficiently high bending force in the strong axis (perpendicular to the weak axis in the direction of side impacts) to provide the required lateral stiffness to the terminal system for side impacts.

SUMMARY OF THE INVENTION

The breakaway guardrail post of the present invention includes upper and lower post sections which are connected by a specially designed breakaway joint. The joint is attached at one end to the upper post by a first fastener and connected at a second end by a second fastener. The first fastener has a failure strength less than that of the second fastener. The failure or yield is at a predictable force threshold when impacted along the weak axis while maintaining a sufficiently high bending force in the strong axis to provide the required lateral stiffness to the terminal system for side or strong axis impacts.

The present invention discloses several breakaway alternatives for breakaway posts used with a highway guardrail or crash attenuation system. All breakaway alternatives involve joining of two sections (upper and lower) of structural steel shape (e.g., I-beam) posts in such a manner that the joint will fail or yield at a predictable force threshold when impacted along the weak axis while maintaining a sufficiently high bending force in the strong axis to provide the required lateral stiffness to the terminal system for side impacts. The lower section of the post is installed in the ground by either means of driving or drill and backfill. The rail element for the guardrail or crash attenuation system is attached to the upper portion of the post.

BRIEF DESCRIPTION OF THE DRAWINGS

FIG. 3 shows a partial side elevation view of yet another embodiment of the present invention.

FIG. 3A is a top view of the embodiment of FIG. 3.

DETAILED DESCRIPTION OF THE PREFERRED EMBODIMENT

Figure 1:
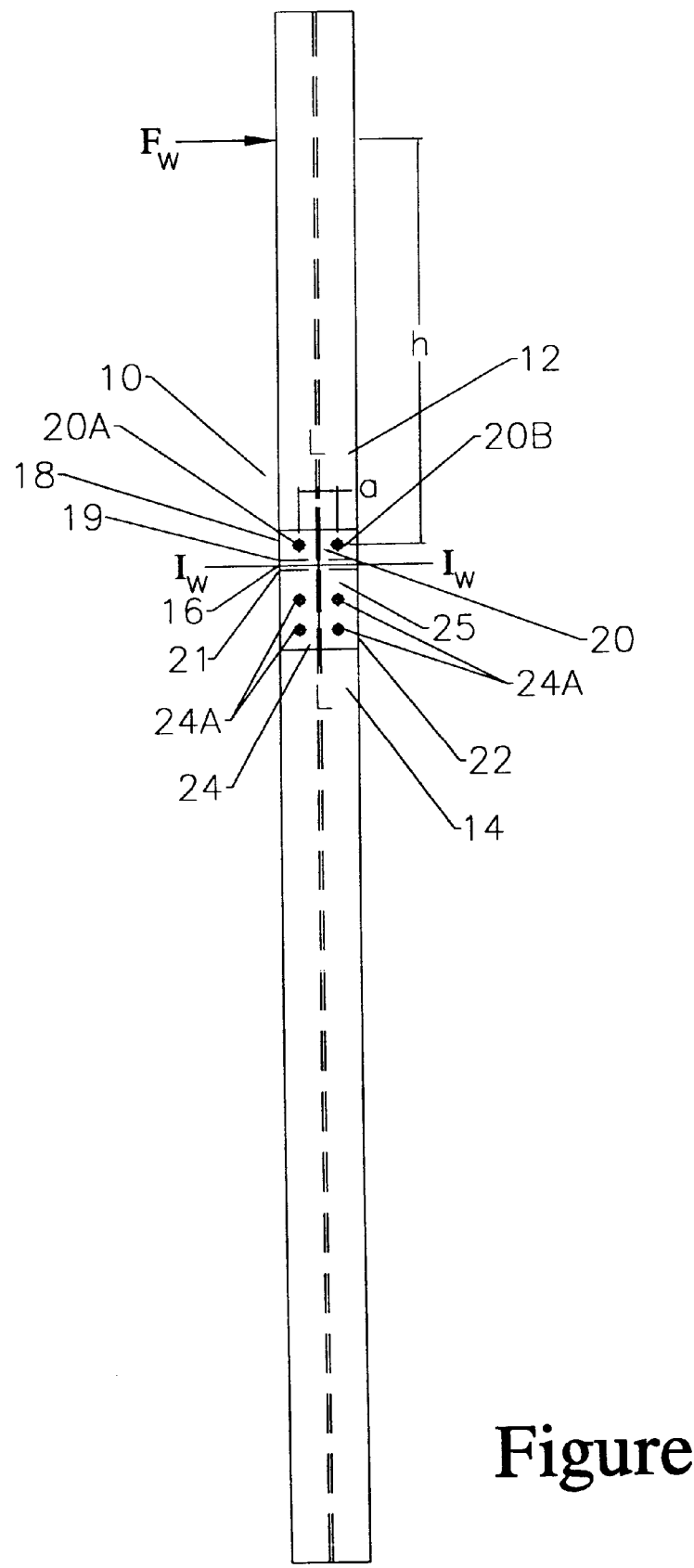
FIG. 1 illustrates a side elevation view of the present invention.

Turning to the drawings, it may be seen in FIG. 1 that the breakaway post 10 of the present invention has an upper post member 12 and a lower post member 14. They are joined by connecting joint 16. The upper end 18 of joint 16 is attached to post member 12 by a first set of fasteners 20 while the lower end 22 of the joint 16 is attached to the lower post 14 by a second set of fasteners 24. As may be seen in FIGS. 1A and 1C the ends 19 and 21 of upper post 12 and lower post 14 are slightly spaced apart when the posts are joined by joint 16 yielding a slight gap 99 between the ends 19 and 21.

Figure 1C:
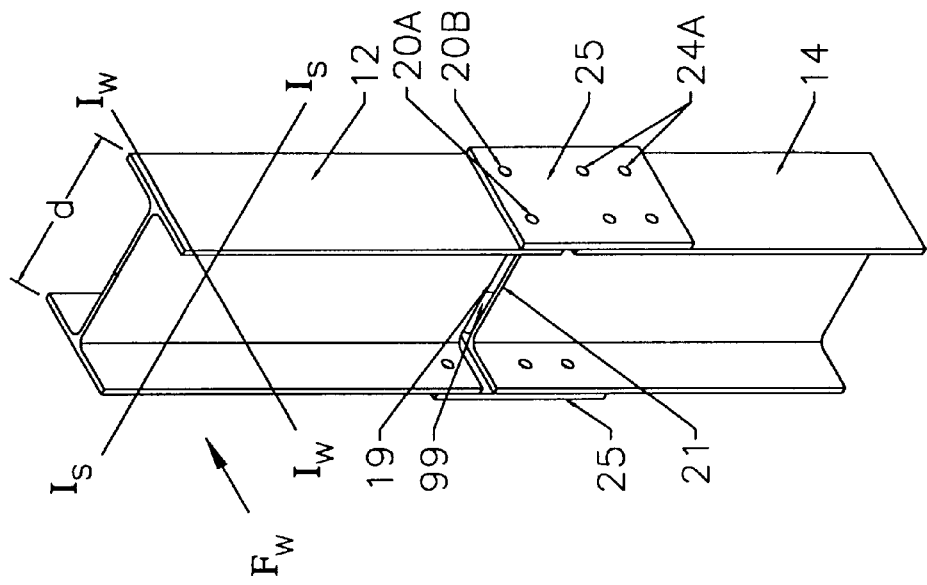
FIG. 1C is a perspective view of the present invention.
Figure 1B:
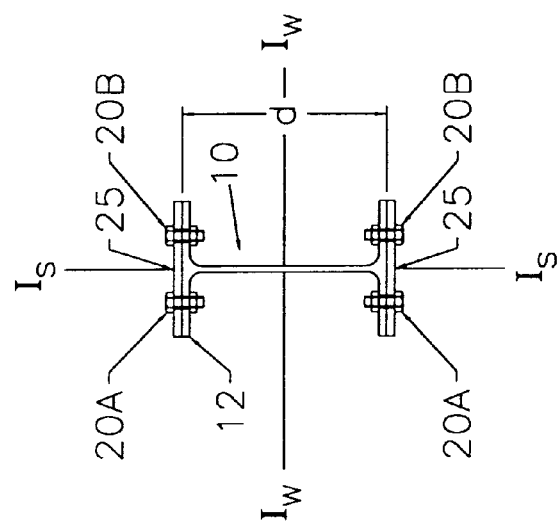
FIG. 1B is a top view of the present invention illustrating the strong and weak axes.
Figure 1A:
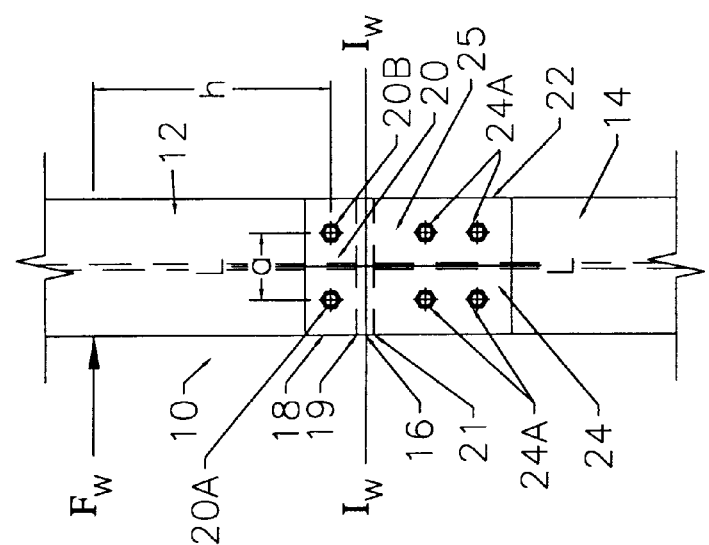
FIG. 1A shows a detailed side view of the joint of the present invention.

In FIGS. 1 and 1A, joint 16 is formed by steel plates 25 on opposite sides of the post 10. The lower post member 14 is rigidly attached to the plates 25 by four or more bolts 24A (or welding) on each side (flange) of the post 14. While FIG. 1B illustrates the post 10 as constructed from steel I-beam other material compositions and composites may be used.

The upper post member 12 is attached to the plates 25 by two through bolts 20A and 20B. Other connectors such as pins, rods, welds and the like may be used.

As shown in the embodiment of FIGS. 1–1C, when impact forces are applied in the weak axis direction $I_w$, one of the two through bolts 20A or 20B breaks and the upper post 12 rotates downwardly. The fracture force in the weak direction is:

$$F_w = \frac{2aV_b}{h}$$

where, $F_w$ = static force required to fail one through bolt about the weak axis.

a = distance between the through bolts.

h = height of $F_w$ above the through bolts.

$V_b$ = shear strength of through bolts.

The force required to fail the connection in the strong direction is then $$F_d = \frac{2dV_b}{h}$$

where $F_s$ = static force required to fail through bolts when loaded about strong axis.

d = post depth (shown in FIG. 1).

The ratio between these two failure forces $R_f$ is shown below. Thus, the post strengths in each direction can be controlled by selecting the bolt size to control $V_b$ and the appropriate radio d/a.

$$R_f = \frac{d}{a}$$

Thus, the connecting joint member or plate 25 is connected to upper post 12 at the upper end 18 by first fasteners 20A and 20B to lower post 14 with the lower end 22 attached by a second fastener 24A. The first fasteners have a failure strength less than the failure strength of the second fasteners. When the impact face strikes the upper post member 12 along the direction of the weak axis $I_w$, one of the first fasteners 20A or 20B fails and the upper post 12 rotates downwardly about the other 20A or 20B of the first fasteners.

Figures 2, 2A:
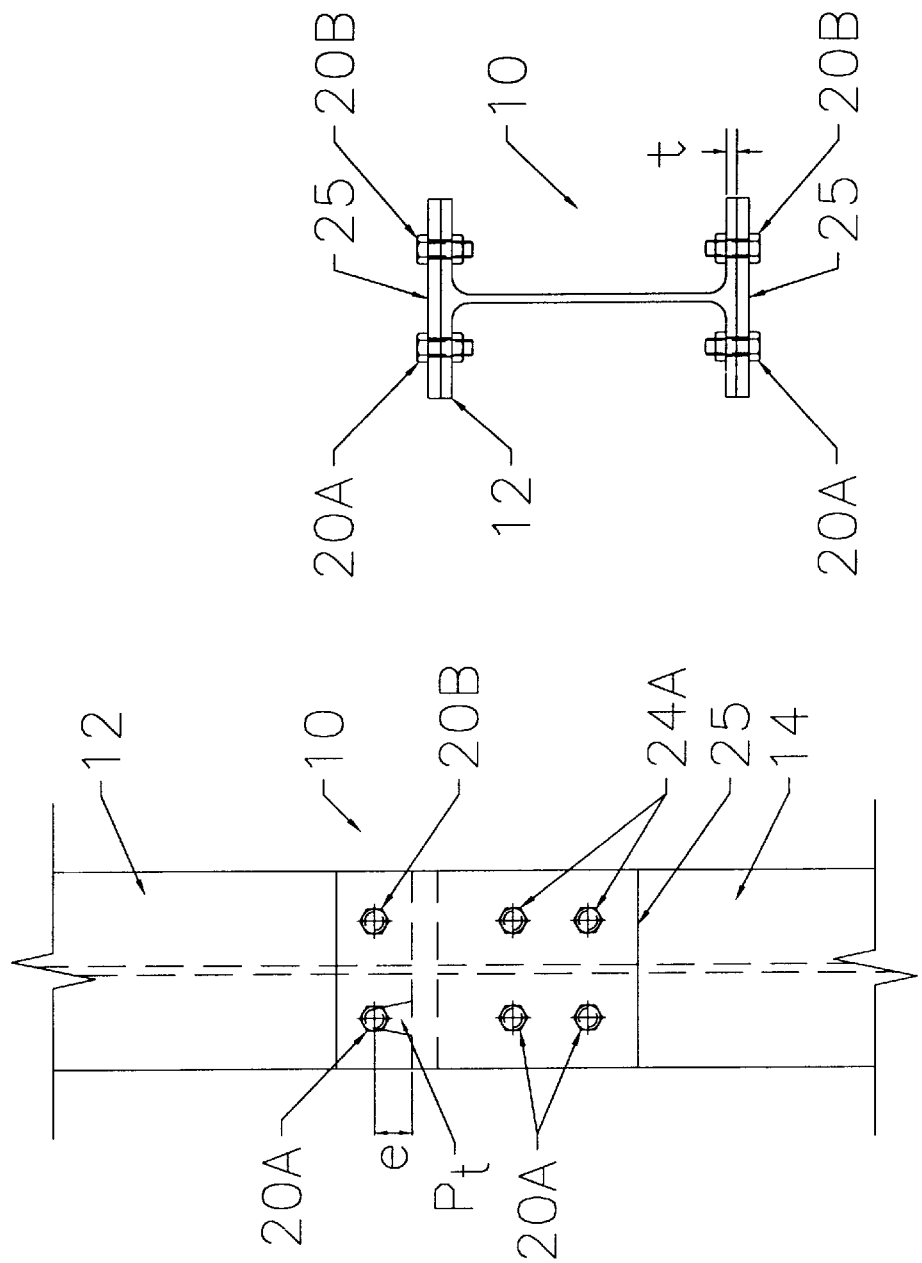
FIG. 2 illustrates an alternative embodiment of the joint of the present invention.
FIG. 2A is a top view of the post of the present invention.

In the second embodiment shown in FIG. 2, a very similar concept is employed except that the failure mechanism is in tearing out a portion $P_t$ of the upper post 12. The two failure forces, $F_w$ and $F_d$, and the ratio $R_f$, are changed very little for this situation.

$$F_w = \frac{2aV_t}{h} \quad F_d = \frac{2dV_t}{h} \quad R_f = \frac{d}{a}$$

where, $V_t$=force required to tear one bolt through the post flange.

The bolt tear-out force, $V_t$, is controlled by the bolt hole edge distance, e, post flange thickness, t, and the strength of the post material.

Thus, in the FIG. 2 embodiment the upper post 12 has a tear-out portion $P_t$ adjacent the first connector member 20A of the first fastener set such that upon an impact force being applied along the weak impact axis $I_w$, the first connector member 20A pulls through the tear-out portion $P_t$ of the upper post 12 and the upper post 12 rotates downwardly about the second connector member 20B of the first fastener set.

As shown in FIGS. 3, 3A, and 3B, the upper 12 and lower 14 sections of the post assembly 10 are joined by two U- or channel-shaped steel plates 30, one on each flange. The lower section 14 of post 10 is rigidly attached to the steel channels 30 by welding or multiple bolts 31 on each flange of the post 10. The upper section 12 of the post 10 is attached to the steel channels 30 with one large-diameter through bolt 32 that serves as a pin about which the upper section 12 of the post 10 can rotate.

The breakaway force threshold is controlled by the length, thickness and yielding strength (material grade) of the steel channels 30. Upon impact in the direction of the weak axis $I_w$, the upper section 12 of the post will rotate about the pin 32. The rotation will be resisted by the flanges 34A, 34B, 36A and 36B of the steel channels 30 until the force is sufficient to yield these flanges. Thereafter the upper section 12 of the post 10 will be free to rotate downward and away from the impacting vehicle. For impacts in the direction of the strong axis, the large diameter steel pin 32 provides the necessary bending strength to the post. Since the strong and weak axis forces are controlled by entirely different failure mechanisms, this concept allows larger ratios between the two forces than the other concepts.

Figure 4A:
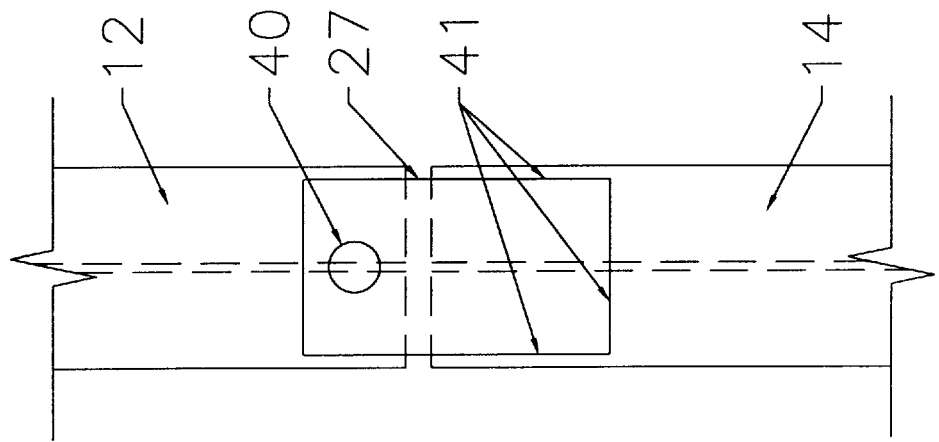
FIG. 4A shows a side elevation view of the plug weld embodiment of the present invention.
Figure 4:
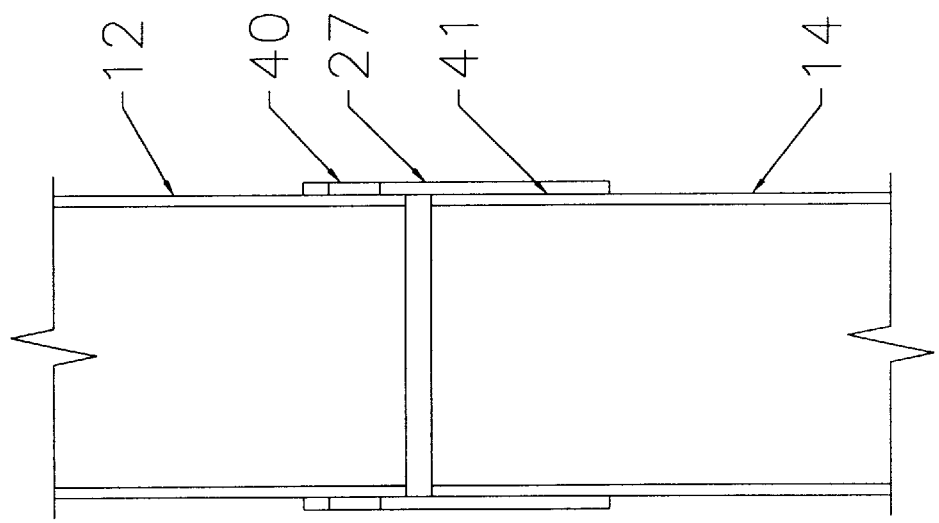
FIG. 4 illustrates a front view from the weak axis direction of a plug weld embodiment of the present invention.

Yet another embodiment shown in FIGS. 4 and 4A relies on weld failures to control the strength of the post 10 in the two directions. This embodiment (FIG. 4) involves joining the upper 12 and lower sections 14 of the post 10 with steel plates 27 similar to that used in the first embodiment of FIG. 1. The steel plates 27 are rigidly welded at welds 41 to the lower section 14 of the post 10 on each flange of the post 10 (FIG. 4A). The upper section 12 of the post 10 is attached to the steel plates 27 with a single weld 40 near the neutral axis $A_n$ for bending in the weak direction $I_w$. The breakaway force threshold is controlled by the length, size, and shape of the weld. Upon impact in the direction of the weak axis, the single weld 40 on each of the two plates 22 is loaded in torsion. When torsional stresses reach the shear strength of the weld material, the weld 40 will fail and allow the upper section 12 of the post 10 to break away from the lower section 14 of the post 10. For impacts in the direction of the strong axis $I_s$, the welds 40 are loaded in direct shear and provide much greater strength. For circular plug welds, the failure forces and their ratio become, $$F_w = \frac{0.577\sigma_y \pi r^3}{2h} \quad F_s = \frac{0.577\sigma_y \pi r^2 d}{h} \quad R_f = \frac{2d}{r}$$

where, r=radius of plug weld.

In this case the connection can be completely controlled by selecting the yield strength of the weld material, the size of the post, and the radius of the plug weld. Other weld shapes, including single or multiple line welds, can also provide the necessary post behavior.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

We claim:

1. A breakaway guardrail post for highway crash control systems comprising:
   an upper post member having a weak impact axis and a strong impact axis;
   a lower post member disposed beneath and spaced apart from said upper post member;
   a connecting joint member having a first end and a second end, said first end of said joint connected at said first end by a first fastener to said upper post member and connected at said second end by a second fastener to said lower post member, said first fastener having a first failure strength less than a second failure strength of said second fastener.

2. The post of claim 1 wherein said first fastener further comprises: a first connector having a first failure strength, and a second connector having a second failure strength, said first failure strength greater than said second failure strength such that upon an impact force being applied along said weak impact axis, said second connector fails and said upper post rotates about said first connector.

3. The post of claim 1 wherein said upper post further comprises: a tear-out portion adjacent said first fastener such that upon an impact force being applied along said weak impact axis, a first section of said first fastener pulls through said tear-out portion of said upper post and said upper post rotates about a second section of said first fastener.

4. The post of claim 1 wherein said connecting joint further comprises: a U-shaped channel having first and second legs, said legs overlaying opposite sides of said upper post, said first fastener comprising a connector extending through said U-shaped channel and into said upper post, said connector having a failure strength greater than said legs of said channel, such that upon an impact force being applied along said weak impact axis, said legs fail and said upper post rotates about said connector.

5. The post of claim 1 wherein said first fastener further comprises: a weld seam having a failure strength less than said second strength.

6. The post of claim 5 wherein said first fastener further comprises: a plug weld extending through said first end of said connecting joint and said upper post, said plug weld having a torsional failure strength less than said weld seam such that upon an impact force being applied along said weak impact axis, said weld plug fails and said upper post rotates about said weld plug.

* * * * *